(12) United States Patent
Fujiki

(10) Patent No.: US 8,711,214 B2
(45) Date of Patent: Apr. 29, 2014

(54) POSITION AND ORIENTATION MEASUREMENT APPARATUS, POSITION AND ORIENTATION MEASUREMENT METHOD, AND STORAGE MEDIUM

(75) Inventor: Masakazu Fujiki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 469 days.

(21) Appl. No.: 13/033,952

(22) Filed: Feb. 24, 2011

(65) Prior Publication Data

US 2011/0211066 A1  Sep. 1, 2011

(30) Foreign Application Priority Data

Feb. 26, 2010  (JP) ................................. 2010-043064

(51) Int. Cl.
*G01B 11/22* (2006.01)
(52) U.S. Cl.
USPC .......................................... 348/135; 382/103
(58) Field of Classification Search
USPC ........................................................ 382/103
See application file for complete search history.

(56) References Cited

U.S. PATENT DOCUMENTS

| 5,621,807 | A | * | 4/1997 | Eibert et al. ................... 382/103 |
| 6,504,957 | B2 | | 1/2003 | Nguyen et al. |
| 7,053,916 | B2 | | 5/2006 | Kobayashi et al. |
| 7,420,556 | B2 | | 9/2008 | Fujiki |
| 2007/0006091 | A1 | | 1/2007 | Sakagawa et al. |
| 2010/0295924 | A1 | | 11/2010 | Miyatani et al. |

FOREIGN PATENT DOCUMENTS

JP  01-009307 A   1/1989

OTHER PUBLICATIONS

Paul J. Besl, "A Method for Registration of 3-D Shapes", IEEE Transactions on Pattern Analysis and Machine Intelligence, vol. 14, No. 2, Feb. 1992.
Zhengyou Zhang, "A Flexible New Technique for Camera Calibration" http://research.microsoft.com/~zhang, pp. 1-20, Dec. 2, 1998.

* cited by examiner

*Primary Examiner* — Dave Czekaj
*Assistant Examiner* — Shanika Brumfield
(74) *Attorney, Agent, or Firm* — Fitzpatrick, Cella, Harper & Scinto

(57) ABSTRACT

A position/orientation measurement apparatus comprises an obtaining unit to obtain a range image to the target object; a determination unit to determine a coarse position/orientation of the target object based on the range image; a calculation unit to calculate a variation degree of distance information on a region of the range image, which region corresponds to a predetermined region on the shape model; a sampling unit to sample, for each predetermined region on the shape model, sample-points from the predetermined region to reduce the number of sample-points as the variation degree is smaller; an association unit to associate the sample-points and three-dimensional measurement points obtained by converting two-dimensional measurement points on the range image into three-dimensional coordinates based on the coarse position/orientation; and a position/orientation determination unit to determine the position/orientation of the target object based on a sum total of distances between the sample-points and the three-dimensional measurement points.

13 Claims, 10 Drawing Sheets

F I G. 6A
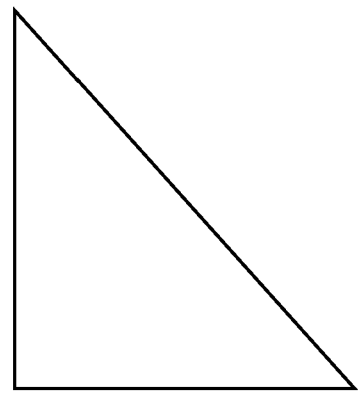
F I G. 6B
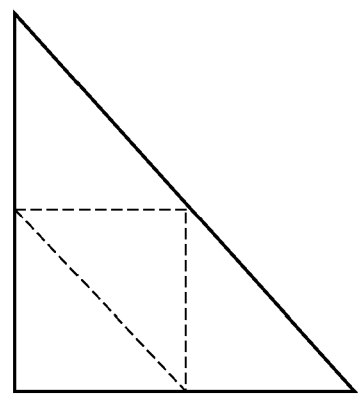
F I G. 6C
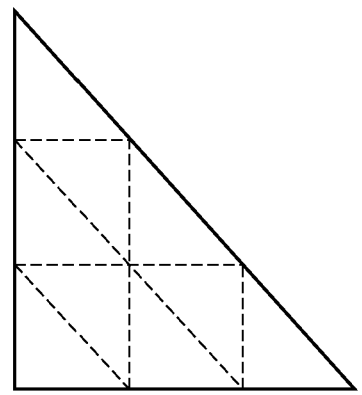

POSITION AND ORIENTATION MEASUREMENT APPARATUS, POSITION AND ORIENTATION MEASUREMENT METHOD, AND STORAGE MEDIUM

BACKGROUND OF THE INVENTION

1. Field of the Invention

The present invention relates to a technique for measuring the position and orientation of an object whose three-dimensional shape is given and, more particularly, to a position and orientation measurement apparatus which calculates the position and orientation of a target object based on a range image obtained by capturing an image of the target object, a position and orientation measurement method, and a storage medium.

2. Description of the Related Art

Along with the development of robot technologies in recent years, robots perform complicated tasks, which were manually performed conventionally. As a representative example of such complicated tasks, assembling processes of industrial products are known. Such robot has to hold parts by an end effecter such as a hand, so as to autonomously perform assembling processes. In order to control the robot to hold a part by a robot hand, a relative position and orientation between the part to be held and the robot have to be measured. Then, a moving plan must be designed based on the measurement result so as to actually control actuators. The position and orientation of the robot are measured using a camera or distance sensor mounted on the robot, and methods using a two-dimensional image and range image are typical. Especially, in a scene of an office or factory, when a target such as a part of an industrial product has only monotonic features such as lines, curves, and planes with small density changes, a range image is normally used.

P. J. Besl and N. D. McKay, "A method for registration of 3-D shapes," IEEE Transactions on Pattern Analysis and Machine Intelligence, vol. 14, no. 2, pp. 239-256, 1992. discloses a method to measure the position and orientation of an object by model fitting to a range image. With this method, a range image is converted into a three-dimensional point cloud data, and a three-dimensional shape model of a target object is fitted to the point cloud data, thereby measuring the position and orientation of the object. That is, for respective points of the point cloud data, adjacent planes of the three-dimensional shape model are searched for based on coarse values of the position and orientation, and optimization of the position and orientation is repeated to minimize a sum of distances between points and planes, thereby calculating the position and orientation.

U.S. Pat. No. 6,504,957 discloses a method of estimating the position and orientation of an object by model fitting to an observation image as in P. J. Besl and N. D. McKay, "A method for registration of 3-D shapes," IEEE Transactions on Pattern Analysis and Machine Intelligence, vol. 14, no. 2, pp. 239-256, 1992. At this time, a small-curvature plane is selected from a model of the object, and a difference of a distance between the selected plane and a corresponding plane on distance measurement data is minimized.

The method of estimating the position and orientation of an object using a range image as in P. J. Besl and N. D. McKay, "A method for registration of 3-D shapes," IEEE Transactions on Pattern Analysis and Machine Intelligence, vol. 14, no. 2, pp. 239-256, 1992. suffers a problem that requires a long calculation time for search processing of planes of the three-dimensional model corresponding to respective points of the point cloud data of the range image.

As a solution of this problem, a method of reducing the number of correspondences may be used. However, measurement data always include errors. When the number of correspondences is reduced, a degree of contribution of each individual corresponding point to calculation processing upon estimation of the position and orientation becomes relatively high. Therefore, when the corresponding points include those based on measurement data having large errors, the position/orientation estimation precision lowers.

To solve the aforementioned problem, U.S. Pat. No. 6,504,957 assumes that small-curvature portions on a measurement target object suffer small distance measurement errors, and limits a processing target to these small-curvature portions on the model, thereby speeding up the processing without lowering the precision.

However, in practice, even a small-curvature portion does not always have high distance measurement precision. This will be described below with reference to FIG. 1. FIG. 1 is a principle view for explaining the aforementioned phenomenon. Referring to FIG. 1, an image capturing unit 101 configures a distance measurement apparatus (to be also referred to as a range image measurement apparatus hereinafter). A measurement target object 102 has portions having small curvatures. Points 103 and 104 as two points on the surface of the measurement target object 102 will be examined. In this case, the point 104 has a smaller curvature than that of the point 103. However, upon examination of regions 105 and 106 that observe pixels corresponding to regions including the points 103 and 104, a distribution of distances from the image capturing unit 101 of the surface on the measurement target object included in the region 106 extends over a broader range than the region 105. Therefore, a variation error of a distance measurement value of the point 104 is larger than that of a distance measurement value of the point 103. In this manner, a small-curvature portion often has lower distance measurement precision than a large-curvature portion depending on an inclination of a plane. In such case, according to the method of U.S. Pat. No. 6,504,957, since the position and orientation of an object are estimated by selecting a region having large variation errors of distance measurement values (a small-curvature region), the position/orientation estimation precision becomes lower than that obtained when the method of U.S. Pat. No. 6,504,957 is not used.

That is, with the method of U.S. Pat. No. 6,504,957, since data with smaller measurement errors cannot be reliably selected, the position/orientation estimation precision is lowered unwantedly.

In consideration of the aforementioned problems, the present invention provides a technique for maintaining and improving a processing speed while preventing the position/orientation estimation precision from being lowered.

SUMMARY OF THE INVENTION

According to one aspect of the present invention, there is provided a position and orientation measurement apparatus for measuring a three-dimensional position and orientation of a target object, a shape model of which indicates a three-dimensional shape of the target object and is given, the apparatus comprising: an obtaining unit adapted to obtain a range image to the target object, which is captured by an image capturing unit; a coarse position/orientation determination unit adapted to determine a coarse position and orientation of the target object based on the range image; a calculation unit adapted to calculate a variation degree of distance information on a region of the range image, which region corresponds to a predetermined region on the shape model; a sampling unit adapted to sample, for each predetermined region on the shape model, sample points from the predetermined region so as to reduce the number of sample points as the variation degree is smaller; an association unit adapted to associate the sample points and three-dimensional measurement points obtained by converting two-dimensional measurement points on the range image into three-dimensional coordinates based on the coarse position and orientation; and a position/orientation determination unit adapted to determine the position and orientation of the target object based on a sum total of distances between the sample points and the three-dimensional measurement points.

According to one aspect of the present invention, there is provided a position and orientation measurement apparatus for measuring a three-dimensional position and orientation of a target object, a shape model of which indicates a three-dimensional shape of the target object and is given, the apparatus comprising: an obtaining unit adapted to obtain a range image to the target object, which is captured by an image capturing unit; a coarse position/orientation determination unit adapted to determine a coarse position and orientation of the target object based on the range image; an error calculation unit adapted to calculate a systematic error included in distance information on a region of the range image, which region corresponds to a predetermined region on the shape model; a sampling unit adapted to sample, for each predetermined region on the shape model, sample points from the predetermined region so as to reduce the number of sample points as the systematic error is larger; an association unit adapted to associate the sample points and three-dimensional measurement points obtained by converting two-dimensional measurement points on the range image into three-dimensional coordinates based on the coarse position and orientation; and a position/orientation determination unit adapted to determine the position and orientation of the target object based on a sum total of distances between the sample points and the three-dimensional measurement points.

Further features of the present invention will be apparent from the following description of exemplary embodiments with reference to the attached drawings.

BRIEF DESCRIPTION OF THE DRAWINGS

FIGS. 6A to 6C are views for explaining the principle of a method of dividing a triangular patch into small regions;

DESCRIPTION OF THE EMBODIMENTS

Figure 1:
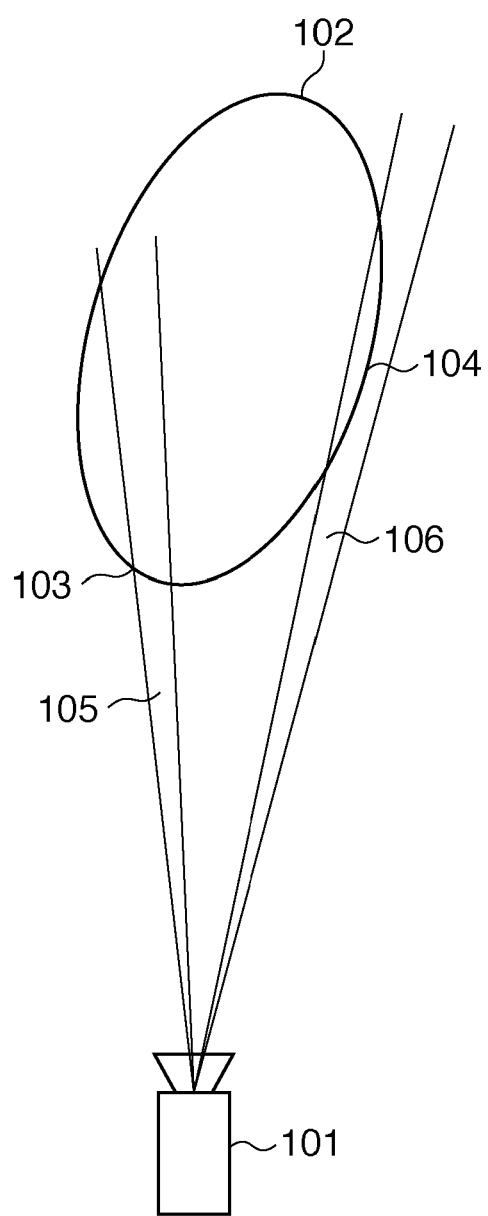
FIG. 1 is a principle view for explaining a phenomenon that even a small-curvature portion does not always have high distance measurement precision.

An exemplary embodiment(s) of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

A method of reducing a load on association processing while maintaining high position/orientation estimation precision by sampling local regions to be associated with a range image from a model of a target object in accordance with characteristics and magnitudes of distance measurement errors will be described below. The range image is an image which holds distance information to the target object as each pixel value.

This embodiment will explain a case in which measurement values upon distance measurement include accidental errors (variations of distance measurement values). In this case, assume that systematic errors (offsets from true values) of the distance measurement values are small.

In this embodiment, sample points are selected from the surface of a shape model of a target object, and a three-dimensional point cloud converted from the range image are associated with the sample points. Then, by minimizing a sum total of distances between corresponding point pairs, the position and orientation of the target object are determined (estimated).

Upon selection of the sample points, for each small region (predetermined region) on the shape model surface, the magnitudes of accidental errors (degrees of variation of measurement values) caused when a region on the measurement target object surface corresponding to that small region undergoes the distance measurement are estimated. Then, the density of points to be sampled from that small region is determined according to the magnitudes of the variations of the distance measurement values. More specifically, the density of sample points is increased as the variations of the distance measurement values are larger. That is, a larger number of points are sampled as the variation values are larger. Conversely, a smaller number of points are sampled as the variation values are smaller. However, the upper limit number of sample points is set for all small regions so that the number of sample points becomes smaller than a case in which the three-dimensional measurement point cloud is associated with the shape model for respective pixels of the range image. By controlling the sampling density in this way, the number of corresponding points can be reduced compared to a method of performing association for respective pixels of the range image. Then, by applying an effect of calculating an average of a large number of points for a region that suffers large variations of measurement values, it is expected that the influence of errors can be reduced, and the position and orientation measurement results can assume values closer to true values.

Note that measurement errors upon distance measurement are estimated based on angles made by the measurement direction of a distance measurement apparatus and normal directions to respective small regions on the measurement target object surface. More specifically, it is estimated that variations of measurement values are smaller as an angle between the measurement direction and object surface is closer to a vertical state, and variations of measurement values are larger as an angle between the measurement direction and object surface is closer to a parallel state.

Details of a position and orientation measurement apparatus according to this embodiment will be described below.

Figure 2:
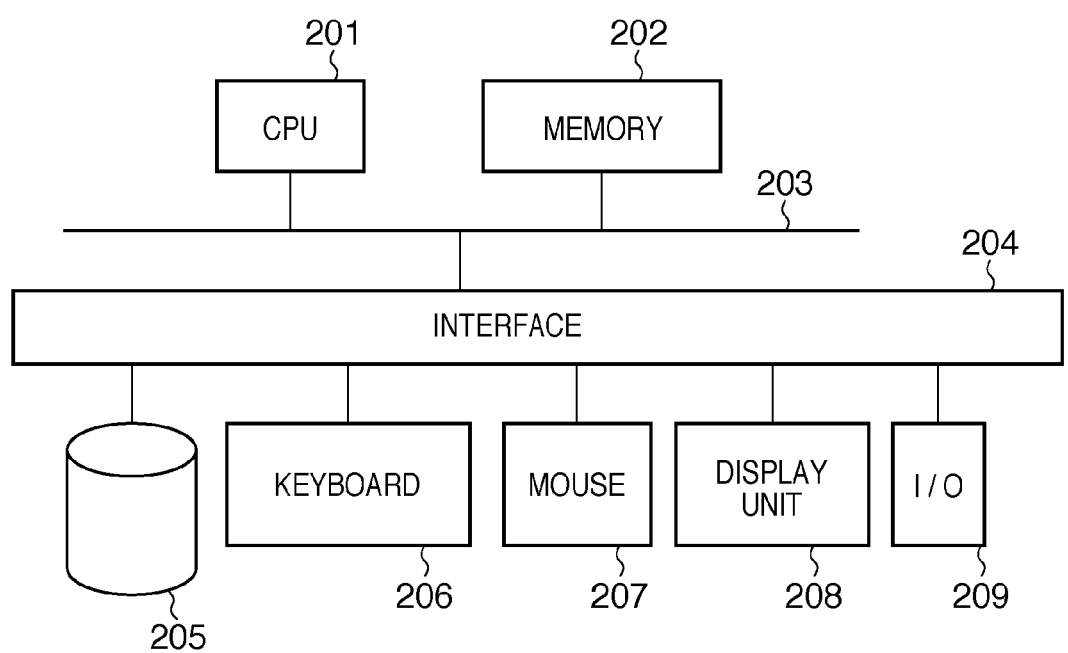
FIG. 2 is a block diagram showing the arrangement of an apparatus according to the embodiments.

The hardware arrangement of the position and orientation measurement apparatus according to this embodiment will be described first with reference to FIG. 2. Referring to FIG. 2, a CPU 201 controls the operation of the overall apparatus. A memory 202 stores programs and data used for the operation of the CPU 201. A bus 203 connects respective modules to allow data transfer. An interface 204 interfaces between the bus 203 and various devices. An external storage device 205 stores programs and data to be loaded by the CPU 201. A keyboard 206 and mouse 207 configure an input device used to launch programs and to designate operations of the programs. A display unit 208 is used to display the operation results of processes, and includes, for example, a liquid crystal panel. A data input/output unit 209 is that with external devices of the apparatus. A range image measurement apparatus (not shown) is connected to the position and orientation measurement apparatus according to the present invention via the data input/output unit 209.

The flowchart showing the sequence of the overall processing of the position and orientation measurement apparatus according to this embodiment will be described below with reference to FIG. 3. In step S301, data used in processing are initially set. More specifically, shape model data, the standard number of samples, and a reference distance are loaded from the external storage device 205 onto the memory 202. The standard number of samples and reference distance will be described later. Also, camera parameters (a principal point position, focal length, image distortion coefficients, the number of pixels, etc.) of an image capturing unit of the range image measurement apparatus (not shown) are obtained from the range image measurement apparatus connected to the data input/output unit 209.

Assume that the shape model is a triangular polygon patch model which expresses the surface of an object as a set of triangular planes. The shape model data includes identification numbers and coordinates of respective vertices of triangular polygons, identification numbers of respective triangular polygons and identification numbers of vertices which form each polygon, and normal vectors to respective triangular polygons. Assume that the normal vector to each triangular polygon indicates a direction directed from the interior to the exterior of the shape model.

The camera parameters are calibrated in advance by a method disclosed in Z. Zhang, "A flexible new technique for camera calibration," IEEE Transactions on Pattern Analysis and Machine Intelligence, vol. 22, no. 11, pp. 1330-1334, 2000. Using the camera parameters input in step S301, two-dimensional coordinates obtained when a point on a three-dimensional coordinate system of the image capturing unit of the range image measurement apparatus is projected onto a range image (onto a two-dimensional coordinate system) can be calculated.

In step S302, range image data obtained by measuring the measurement target object is obtained from the range image measurement apparatus (not shown) connected to the data input/output unit 209, and is stored in the memory 202. Note that the range image is captured by, for example, a light-section method or stereo method.

In step S303, a coarse position and orientation of the measurement target object (a coarse relative position/orientation of the measurement target object with respect to the image capturing unit of the distance measurement apparatus) are determined. This coarse position/orientation determination processing can use a method disclosed in, for example, Japanese Patent Laid-Open No. 01-009307.

In step S304, errors of the range image data input in step S302 are estimated. The processing of this step will be described later.

In step S305, a predetermined region (local region), that is, a point cloud, which is to be associated with the range image data, is selected from the shape model surface based on the errors of the range image data estimated in step S304. Details of the point cloud selection processing from the shape model surface in step S305 will be described later.

In step S306, sample points selected in step S305 are associated with the range image. More specifically, three-dimensional coordinates of respective sample points on the coordinate system of the target object are converted into those on the coordinate system of the image capturing unit of the distance measurement apparatus based on the coarse position and orientation of the measurement target object calculated in step S303. Furthermore, two-dimensional coordinates of points, which are obtained by projecting the three-dimensional coordinates of the respective sample points on the coordinate system of the image capturing unit onto the range image, are calculated based on the camera parameters input in step S301. Since the coordinate value calculated in this way does not always match the coordinates of a pixel of the range image, a nearest neighbor (most adjacent) pixel of the projected point is searched for on the range image. Then, three-dimensional coordinates of the pixel of the search result on the image capturing unit coordinate system are calculated based on the two-dimensional coordinates (two-dimensional measurement point) and distance value of that pixel, and are converted into those on the coordinate system of the target object based on the coarse position and orientation of the measurement target object calculated in step S303. The three-dimensional coordinates of the distance measurement points calculated in this way are added to a corresponding point pair list whose storage area is assured on the memory 202 to be paired with the three-dimensional coordinates of the corresponding sample points.

Note that processing for eliminating association errors may be executed in addition to the association processing of the sample points and range image. More specifically, at a given corresponding point on the range image, a normal direction to that corresponding point is calculated from neighboring distance measurement point cloud data, and is converted into a direction on the coordinate system of the target object. The normal calculated in this way is compared with a normal direction of a triangular patch which includes a sample point corresponding to that corresponding point. When the normal directions are largely different, that corresponding point is not added to the corresponding point pair list.

Finally, an optimization problem is solved to minimize a sum total of distances between the corresponding pairs calculated in step S306, thereby calculating the position and orientation of the measurement target object. Details of this step will be described later.

Details of the distance measurement error amount estimation processing (step S304) will be described below. A method of estimating a variation value indicating a variation degree of a measurement value according to this embodiment will be described below with reference to FIG. 4.

Figure 4:
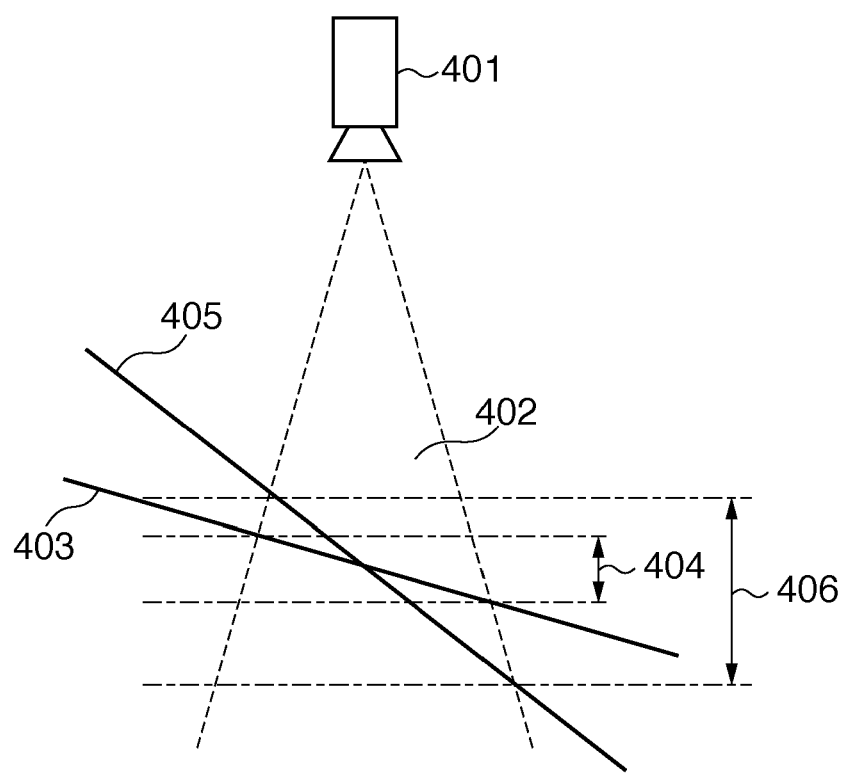
FIG. 4 is a view for explaining the principle of generation of accidental errors upon measurement of a range image.

FIG. 4 shows the positional relationship between the observation direction of an image capturing unit 401 of the range image measurement apparatus, and a surface 403 or 405 of the measurement target object. The surface 403 represents a case nearly perpendicular to the observation direction of the image capturing unit 401, and the surface 405 represents a case nearly parallel to the observation direction of the image capturing unit 401. Referring to FIG. 4, assume that a region 402 is a region corresponding to a certain pixel of the image capturing unit 401. The surface region of the measurement target object is distributed within a range 404 or 406. That is, a variation value of distance information of that pixel is equal to an interval of the range 404 or 406. Therefore, the value of the distance information can be measured by an angle made by the observation direction of the image capturing unit and a normal to a plane of the measurement target object.

Figure 5:
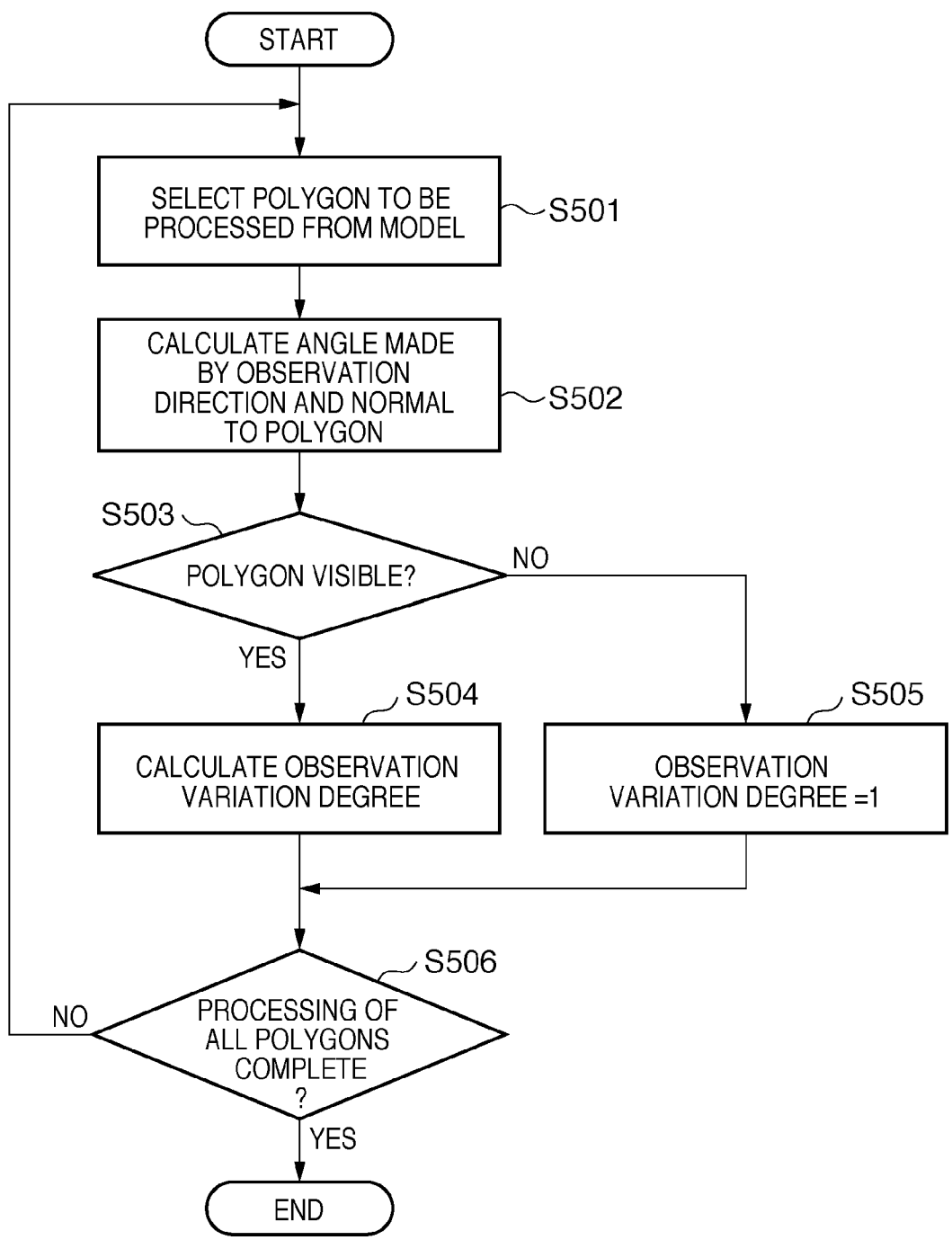
FIG. 5 is a flowchart showing the sequence of distance measurement error estimation processing according to the first embodiment.

The flowchart showing the sequence of the distance measurement error amount estimation processing will be described below with reference to FIG. 5. In step S501, one triangular polygon to be processed is selected from those included in the shape model. In this case, in steps S502 to S506, the triangular polygon selected in step S501 is to be processed. Assume that an identification number of the triangular polygon selected in this step is i. In the following description, a suffix "i" is an index associated with the triangular polygon selected in this step.

In step S502, an angle $\alpha_i$ ($-\pi \leq \alpha_i \leq \pi$) made by the observation direction of the range image measurement apparatus and the polygon to be processed is calculated. Assume that the observation direction of the range image measurement apparatus is expressed by a direction vector on the coordinate system of the target object based on the coarse position and orientation of the target object calculated in step S303.

Next, whether or not the polygon to be processed is visible from the range image measurement apparatus is judged in step S503 based on the angle $\alpha_i$ calculated in step S502. More specifically, if $-(\pi/2+\phi) \leq \alpha_i \leq \pi/2+\phi$ is not satisfied, since the range image measurement apparatus observes the obverse side of the polygon to be processed, it is judged that the polygon is visible, and the process advances to step S504. On the other hand, if $-(\pi/2+\phi) \leq \alpha_i \leq \pi/2+\phi$ is satisfied, the range image measurement apparatus observes the reverse side of the polygon to be processed, or the observation direction is parallel to the polygon plane. Therefore, it is judged that the polygon to be processed is invisible, and the process advances to step S505. Note that $\phi$ is an angle constant which represents an unmeasurable limit when the observation direction of the range image measurement apparatus is nearly parallel to the target object surface (for example, due to a decrease in reflected light amount of the object surface).

In the above description, whether or not the polygon to be processed is visible is judged based only on the angle made by the observation direction of the range image measurement apparatus and the normal direction to that polygon. Furthermore, processing for judging that the polygon is invisible when that polygon is occluded behind another polygon when viewed from the range image measurement apparatus may be added. Such judgment processing can be implemented using an occlusion judgment technique in computer graphics.

In step S504, a variation degree $u_i$ of the distance measurement value is calculated based on:

$$u_i = |\tan \beta_i| \quad (1)$$

for $\beta_i = \pi - \alpha_i$

On the other hand, if the polygon is invisible, the variation degree $u_i$ of the distance measurement value is set to be $-1$ in step S505. However, the value of the variation degree set in this step is not limited to $-1$ as long as it can be a value that cannot be assumed when the polygon to be processed is visible.

Note that the variation degree calculated in step S504 or that which is set in step S505 is stored in the memory 202 as a set with the identification number of the polygon.

Upon completion of the processing in step S504 or S505, the process advances to step S506.

It is judged in step S506 if the processing for setting the variation degree is complete for all the triangular polygons included in the shape model. If it is judged that the processing is complete (step S506; YES), the overall error amount estimation processing ends. On the other hand, if it is judged that the processing is not complete for all the polygons (step S506; NO), the process returns to step S501.

The sequence of the distance measurement error amount estimation processing has been described.

Details of the local region selection processing (step S305) will be described below.

In step S305, in association with each triangular polygon included in the shape model, the number $N_i$ of sample points is calculated based on:

$$\begin{aligned} N_i &= 0, \text{ if } u_i = -1 \\ &= S \times (d_i/D)^2 \times A_i \times |\cos \beta_i| \times C_u \times u_i, \text{ otherwise} \end{aligned} \quad (2)$$

where S and D are respectively the standard number of samples and the reference distance which are stored in the memory 202 in step S301. The standard number of samples is the number of pixels included in a region specified when a plane of a unit area, which is located at a position of the reference distance from the distance measurement apparatus and is perpendicular to the measurement direction of the distance measurement apparatus, is projected onto the range image, and prescribes the upper limit number of sample points. $d_i$ is a distance between the distance measurement apparatus and a triangular polygon of the identification number i, which distance is calculated based on the coarse position and orientation of the target object estimated in step S303. By multiplying $(d_i/D)^2$, an increase or decrease effect of the number of pixels included in a region specified when a certain triangular polygon is projected onto the range image can be reflected to the number of sample points.

Also, $A_i$ is an area of the polygon of the identification number i. $|\cos \beta_i|$ is a ratio of decreasing the area of a region specified when the triangular polygon is projected onto the range image depending on the direction of the polygon. $u_i$ is a variation degree of the distance measurement value calculated in step S304. $C_u$ is a constant required to adjust a degree of contribution of the variation degree of the distance measurement value with respect to the density of sample points.

Note that when the polygon to be processed is invisible ($u_i = -1$), since no sample point is selected from that polygon, $N_i = 0$.

Sample points are allocated one by one from respective small regions obtained when the triangular polygon is divided into small regions which have the same area and a triangular shape.

The principle of the division method of the triangular polygon will be described below with reference to FIGS. 6A to 6C. FIG. 6B shows an example in which a triangular polygon shown in FIG. 6A is divided into four small regions by coupling two-divided points of the respective sides of the polygon. FIG. 6C shows an example in which the triangular polygon shown in FIG. 6A is divided into nine small regions by dividing the respective sides of the polygon into three. Likewise, by increasing the number of divisions n ($n \geq 2$) of each side, the triangular polygon can be divided into $n^2$ ($n \geq 2$) small regions. Hence, $n^2$ closest to the number $N_t$ of sample points calculated using equation (2) is calculated, and the barycenters of respective small regions obtained by dividing the polygon into $n^2$ regions, as shown in FIGS. 6A to 6C, are set as sample points. The coordinates of the sample point cloud calculated in this case (the coordinate values on the coordinate system of the target object) are stored in the memory 202 together with the identification number of the triangular polygon.

Finally, details of the position/orientation calculation processing of the target object (step S307) will be described below. In this step, the position and orientation of the model are calculated to minimize the sum total of distances between corresponding point pairs registered in the corresponding point pair list, and the calculation results are set as the position and orientation of the target object.

The three-dimensional coordinates on the coordinate system of the image capturing unit of the range image measurement apparatus can be converted into three-dimensional coordinates (x, y, z) on the coordinate system of the target object via a position/orientation vector s of the target object. In this case, the position and orientation of the measurement target object are expressed in six degrees of freedom. That is, the vector s is a six-dimensional vector, which includes three elements that represent the position of the measurement target object, and three elements that represent the orientation. Now assume that an arbitrary point on the image capturing unit coordinate system is converted into a point $(x_0, y_0, z_0)$ on the target object coordinate system based on the coarse position and orientation of the target object calculated in step S303. A point (x, y, z) changes depending on the position and orientation of the target object, and can be approximated using a linear Taylor expansion in the vicinity of $(x_0, y_0, z_0)$ like:

$$\left. \begin{array}{l} x \approx x_0 + \sum_{j=1}^{6} \frac{\partial x}{\partial s_j} \Delta s_j \\ y \approx y_0 + \sum_{j=1}^{6} \frac{\partial y}{\partial s_j} \Delta s_j \\ z \approx z_0 + \sum_{j=1}^{6} \frac{\partial z}{\partial s_j} \Delta s_j \end{array} \right\} \quad (3)$$

A plane on the target object coordinate system of a triangular patch plane that includes a corresponding point on the shape model side of an arbitrary corresponding point pair stored in the memory 202 is described by $ax+by+cz=e$ ($a^2+b^2+c^2=1$, a, b, c, and e are constants). Assume that (x, y, z) converted using correct s satisfies the plane equation $ax+by+cz=e$ ($a^2+b^2+c^2=1$). Substitution of expressions (3) into this plane equation yields:

$$a \sum_{j=1}^{6} \frac{\partial x}{\partial s_j} \Delta s_j + b \sum_{j=1}^{6} \frac{\partial y}{\partial s_j} \Delta s_j + c \sum_{j=1}^{6} \frac{\partial z}{\partial s_j} \Delta s_j = e - q \quad (4)$$

for $q = ax_0 + by_0 + cz_0$ (constant)

Since equation (4) holds for all the corresponding point pairs, linear simultaneous equations about $\Delta s_j$ hold, as given by:

$$\begin{bmatrix} a_1 \frac{\partial x_1}{\partial s_1} + b_1 \frac{\partial y_1}{\partial s_1} + c_1 \frac{\partial z_1}{\partial s_1} & a_1 \frac{\partial x_1}{\partial s_2} + b_1 \frac{\partial y_1}{\partial s_2} + c_1 \frac{\partial z_1}{\partial s_2} & \cdots & a_1 \frac{\partial x_1}{\partial s_6} + b_1 \frac{\partial y_1}{\partial s_6} + c_1 \frac{\partial z_1}{\partial s_6} \\ a_2 \frac{\partial x_2}{\partial s_1} + b_2 \frac{\partial y_2}{\partial s_1} + c_2 \frac{\partial z_2}{\partial s_1} & a_2 \frac{\partial x_2}{\partial s_2} + b_2 \frac{\partial y_2}{\partial s_2} + c_2 \frac{\partial z_2}{\partial s_2} & \cdots & a_2 \frac{\partial x_2}{\partial s_6} + b_2 \frac{\partial y_2}{\partial s_6} + c_2 \frac{\partial z_2}{\partial s_6} \\ \vdots & \vdots & \vdots & \vdots \end{bmatrix} \quad (5)$$

$$\begin{bmatrix} \Delta s_1 \\ \Delta s_2 \\ \Delta s_3 \\ \Delta s_4 \\ \Delta s_5 \\ \Delta s_6 \end{bmatrix} = \begin{bmatrix} e_1 - q_1 \\ e_2 - q_2 \\ \vdots \end{bmatrix}$$

In this case, equations (5) are expressed like:

$$J \Delta s = E \quad (6)$$

Based on equation (6), $\Delta s$ is calculated using a generalized inverse matrix $(J^T \cdot J)^{-1} \cdot J^T$ of a matrix J. Note that in order to relax the influence of outliers due to noise included in the measurement point cloud of the range image, a robust estimation method to be described below may be used. In general, in measurement point cloud data as an outlier, an error value e−q becomes large. For this reason, the degree of contribution of this data with respect to simultaneous equations (5) and (6) increases, and the precision of $\Delta s$ obtained as a result of these equations lowers. Hence, a smaller weight is given to data with a larger error value e−q, and a larger weight is given to data with a smaller error value e−q. The weight is given using a Tukey function, which is given by:

$$w(e - q) = \begin{cases} (1 - ((e - q)/v)^2)^2 & |e - q| \leq v \\ 0 & |e - q| > v \end{cases} \quad (7)$$

where v is a constant. Note that the weighting function is not always the Tukey function, but other functions such as a Huber function may be used as long as they give a smaller weight to data with a larger error and a larger weight to data with a smaller error.

Let $w_j$ be a weight corresponding to each data. In this case, a weighting matrix W is defined by:

$$W = \begin{bmatrix} w_1 & & & 0 \\ & w_2 & & \\ & & \ddots & \\ 0 & & & w_{N_c} \end{bmatrix} \quad (8)$$

The weighting matrix W is a square matrix in which all components assume "0" except for diagonal components, which assume weights $w_j$. $N_c$ is the number of corresponding point pairs. Using this weighting matrix W, equation (6) is modified like:

$$WJ\Delta s = WE \quad (9)$$

Then, a correction value $\Delta s$ is calculated by solving equation (9) like:

$$\Delta s = (J^T W J)^{-1} J^T W E \quad (10)$$

The coarse values of the position and orientation of the model are corrected using the correction value $\Delta s$ calculated in this way, and the correction results are stored in the memory 202 or are output to an external apparatus via the data input/output unit 209.

Note that the aforementioned position/orientation optimization calculation method is based on a Gauss-Newton method. However, the present invention is not limited to this, and other methods such as a Levenberg-Marquardt method and steepest descent method may be used.

As described above, using the method of this embodiment, sample points on the model plane, which are to be associated with the range image, can be adaptively selected according to variations of the range image measurement values. In this manner, the processing can be speeded up by reducing the number of corresponding points, and the estimation precision of the position and orientation can be maintained.

Note that the present invention is not limited to the aforementioned embodiment, and various modifications may be made. The second to eighth embodiments to be described hereinafter are modifications of the first embodiment.

Second Embodiment

In the above description, the processing steps of the coarse position/orientation calculation processing of the target object (step S303), the distance measurement error estimation processing (step S304), the local region selection processing (step S305), the association processing of the local regions and range image (step S306), and the target object position/orientation estimation processing (step S307) are executed each once. However, the number of execution times is not limited to one, and these processes may be repetitively executed to asymptotically improve the estimation precision of the position and orientation. At this time, after completion of the target object position/orientation estimation processing in step S307, it is judged whether or not the number of repetition times reaches a predetermined value. If the number of repetition times reaches the predetermined value, the overall processing may end; otherwise, the process may return to step S303. Alternatively, after completion of the processing in step S307, a model fitting error may be calculated and may be compared with a predetermined threshold. If the error is less than the threshold, the overall processing may end; otherwise, the process may return to step S303. Assume that the model fitting error is, for example, a sum total value of the distances between corresponding point pairs for all the corresponding point pairs. The position and orientation of the target object, which are estimated by one repetition of the sequence, may be used as the coarse position and orientation of the object in step S303 in the next repetition.

When the aforementioned method is used, since the estimation precision of distance measurement errors is improved as that of the position and orientation becomes higher, an effect of eliminating the influence of measurement errors can be enhanced.

Third Embodiment

As the method of calculating the coarse position and orientation of the measurement target object, the method disclosed in Japanese Patent Laid-Open No. 01-009307 is used in the above description. However, the present invention is not limited to this.

For example, a motion velocity or angular velocity of the object is estimated from the previous measurement values by time-series filtering processing using, for example, a linear filter or Kalman filter, and the position and orientation of the object at the current time, which are predicted based on the estimated motion or angular velocity may be used as the coarse position and orientation of the object. When the position and orientation of the object can be measured by another sensor, output values of that sensor may be used as the coarse values of the position and orientation. The sensor may be a magnetic sensor, which measures the position and orientation when a receiver attached to the object detects a magnetic field generated by a transmitter. Alternatively, the sensor may be an optical sensor which measures the position and orientation by capturing an image of a marker arranged on the object using a camera fixed to a scene. In addition, any other sensors may be used as long as they measure the position and orientation in six degrees of freedom. Also, when an approximate position and orientation where the object is placed are given, these values may be used as the coarse values.

Fourth Embodiment

The three-dimensional shape model of the object is configured by only triangular polygons. However, the present invention is not limited to this, and the shape model may be configured by only polygons having a different shape. Furthermore, the shape model may be configured by mixing polygons having a plurality of types of shapes. Furthermore, the three-dimensional shape model may be configured by parametric curved surface patches in place of the plane patches. Furthermore, the shape model may be configured by mixing the plane patches and curved surface patches. However, when the curved surface patches are used, inclinations between the measurement direction of the distance measurement apparatus and model surface are not even in one patch. Hence, the curved surface patch is divided into small regions, and distance measurement errors are estimated for respective small regions so as to select sample points.

Fifth Embodiment

The method of dividing a unit region on the object model surface into small regions having the same area, and selecting the same number of sample points from the respective small regions has been described (step S305). However, the sample point determination method is not limited to this. For example, a unit region on the object model surface may be randomly sampled.

Alternatively, sample points may be densely selected for each unit region, and the dense sample points may be decimated according to a "decimation ratio" obtained by dividing the number of sample points determined based on variations of the distance measurement errors by the number of dense sample points.

Furthermore, coordinates of sample points may be determined for each unit region in correspondence with a plurality of predetermined decimation ratios, and those coordinates of sample point clouds may be registered in the model. Then, sample points, which are registered at a decimation ratio closest to that calculated based on distance measurement errors, may be read out from the memory 202 when they are used.

In this manner, when the method of executing in advance processing about determination of sample points is adopted, a speed-up effect due to a reduction of a calculation load can be enhanced when the position/orientation estimation of the target object is repetitively executed, as described in the second embodiment.

Sixth Embodiment

In the above description, the standard number of samples is set so that the density upon projecting sample points onto the range image is equal to the pixel density. However, the standard number of samples can be set to be smaller. However, the number of sample points is decreased with decreasing standard number of sample points, thus improving the processing speed. However, in a general tendency, the position/orientation estimation precision lowers in such case.

Seventh Embodiment

In the above description, the variation degree of the distance measurement value is evaluated based on an inclination of a plane of the measurement target object. However, the variation degree evaluation method is not limited to this.

For example, when a semitransparent object is irradiated with light, the light is scattered inside the object, and shows high luminance levels at various portions on the object surface. Therefore, when a position directly irradiated with light is searched for on an image, a portion having a high luminance level due to scattered light is often erroneously extracted. This causes variations of distance measurement values. Hence, distance measurement errors may be evaluated based on internal scattering ratios for respective portions of the measurement target object.

Alternatively, since a black object reflects less light, a search for a position irradiated with light often fails since it is buried in noise. This also causes variations of distance measurement values. Hence, distance measurement errors may be evaluated based on reflectances for respective portions of the measurement target object.

Eight Embodiment

In the above description, the local regions selected from the model of the measurement target object in step S305 are points. However, the method of the present invention is not limited to points, and is applicable to a case in which local regions of other types are selected.

For example, plane regions may be selected as the local regions. In this case, in the local region selection step (step S305), small planes as many as a number proportional to the variation degree of distance measurement values associated with the triangular patch, which is calculated in the distance measurement error estimation step (step S304), can be selected from a plane cloud, which is obtained by dividing the triangular patch into small planes having an equal area.

The association processing of the small planes and range image and the estimation processing of the position and orientation of the target object can be implemented in the same manner as in U.S. Pat. No. 6,504,957.

Ninth Embodiment

The first to eighth embodiments consider the case in which measurement values upon distance measurement include accidental errors (variations of measurement values). Then, the method of reducing the load on the association processing while maintaining high position/orientation estimation precision by sampling, from the model, the local regions to be associated with the range image in accordance with the characteristics and magnitudes of the distance measurement errors has been described.

This embodiment will explain a position and orientation measurement method when measurement values upon distance measurement include systematic errors (offset values from true values).

Figure 7:
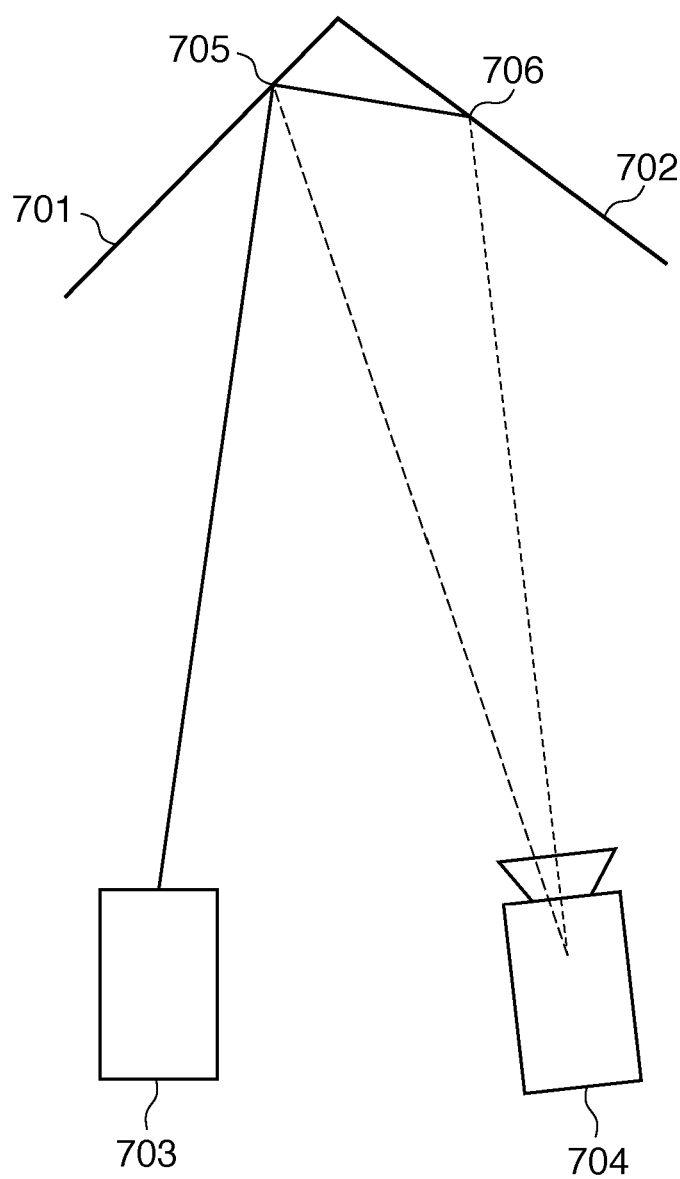
FIG. 7 is a view for explaining the first principle of generation of systematic errors upon measurement of a range image.

The distance measurement uses, for example, a spot light method (triangulation method). A mechanism of generation of systematic errors in this case will be described below with reference to FIG. 7. Referring to FIG. 7, a surface 701 is a portion of a surface which configures the target object. An illumination 703 is a light source which configures a distance measurement apparatus and is used to generate spot light. An image capturing apparatus 704 is that which configures the distance measurement apparatus. In the spot light method, an image of a spot (to be referred to as a "primary reflection spot or primary reflection point" hereinafter) 705 where light emitted from the illumination 703 directly strikes the target object is searched for on an image captured by the image capturing apparatus 704. Then, based on image coordinates of that image, a distance to the primary reflection spot 705 is calculated based on the principle of triangulation.

A case will be examined below wherein another surface 702 exists in the vicinity of the surface 701 irradiated with spot light. In this case, the spot light is reflected on the surface 702 to form a spot (to be referred to as a "secondary reflection spot or secondary reflection point" hereinafter) 706, which is often observed in the image. At this time, when an image of the secondary reflection spot 706 is sufficiently bright, a search result of the spot image often erroneously indicate the secondary reflection spot 706. A distance value calculated from the coordinates of this wrong spot image is offset from a true distance value, and an offset of the distance measurement value becomes larger with increasing an error of the coordinates of the spot image.

Hence, in this embodiment, a measurement error is estimated from differences between the coordinates of a true spot (primary reflection spot) and those of a false spot (secondary reflection spot), and the density of sample points on the model surface is determined based on the magnitude of the measurement error. At this time, when the number of sample points including systematic errors increases, since the position/orientation estimation results also have offsets, the density of sample points is decreased as the systematic errors are larger.

Figure 3:
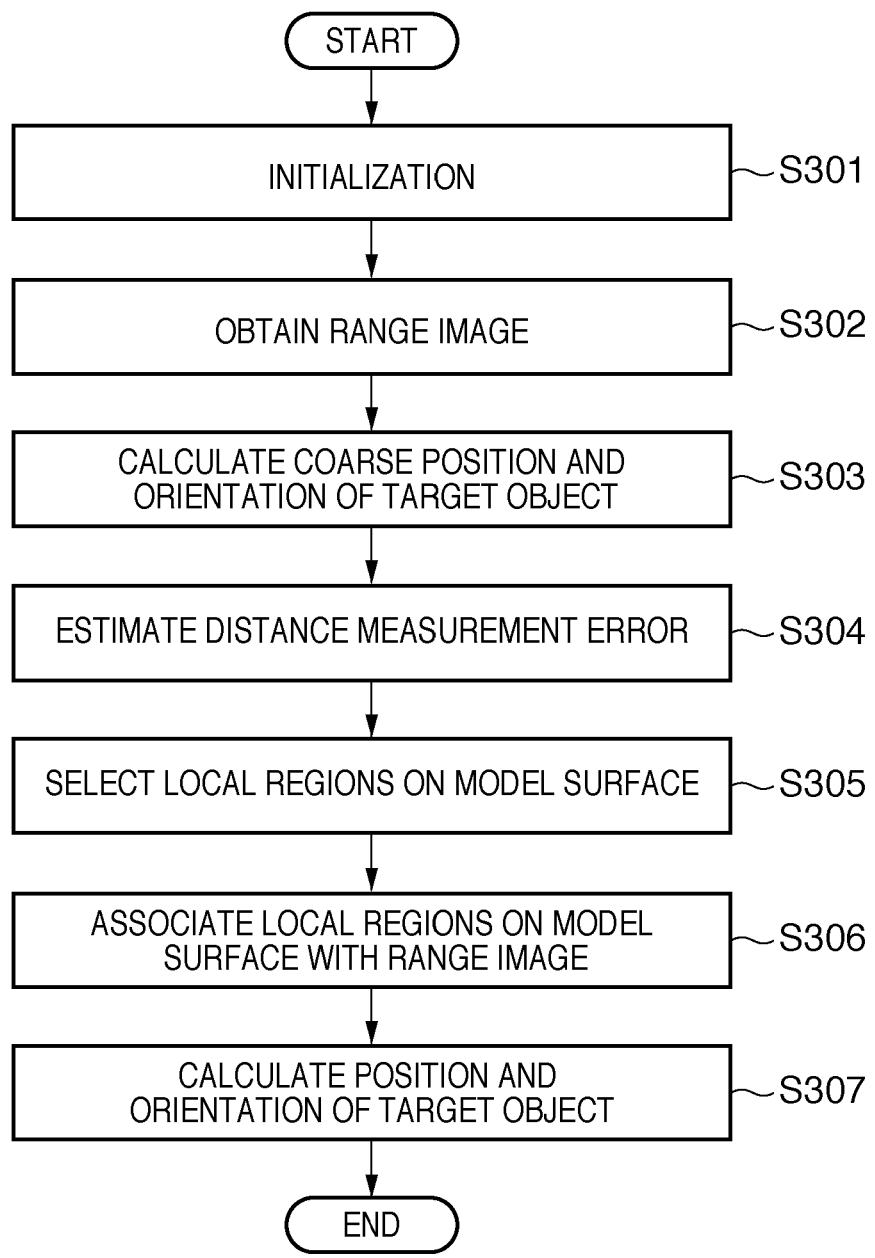
FIG. 3 is a flowchart showing the sequence of overall processing according to the first embodiment.

The sequence of the overall processing according to this embodiment is the same as the flowchart shown in FIG. 3 described in the first embodiment. However, since the contents of the initialization processing (step S301), distance measurement error estimation processing (step S304), and sample point determination processing (step S305) are different from the first embodiment, only these three steps will be described below.

In the initialization processing (step S301), a relative position and orientation between an illumination unit and image capturing unit in a range image measurement apparatus are loaded from the external storage device 205 in addition to data loaded from the external storage device in the initialization processing of the first embodiment.

Figure 8:
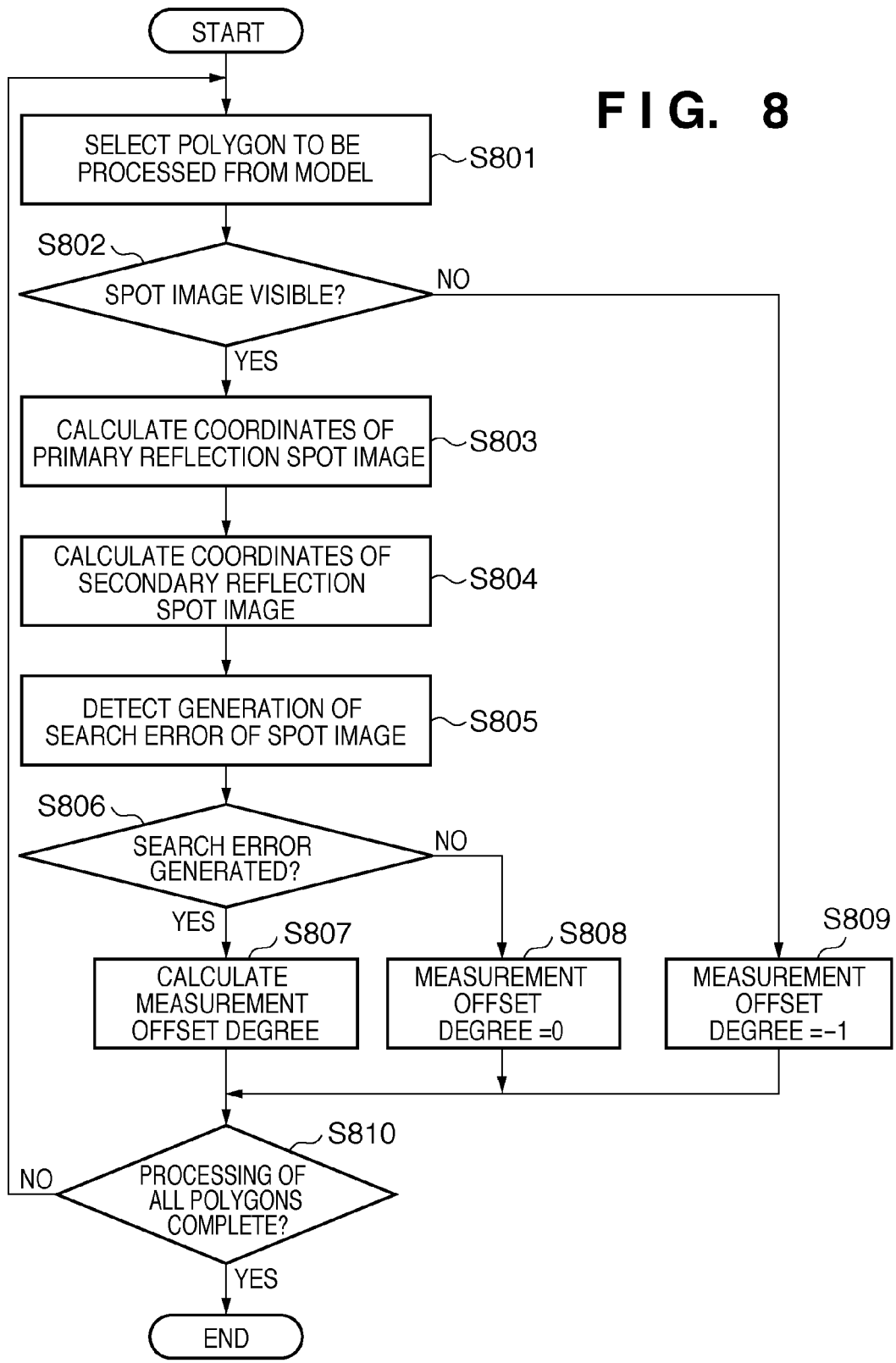
FIG. 8 is a flowchart showing the sequence of distance measurement error estimation processing according to the second embodiment.

The flowchart showing the sequence of the distance measurement error estimation processing (step S304) according to this embodiment will be described below with reference to FIG. 8.

In step S801, a triangular polygon to be processed is selected from those included in a shape model. In steps S802 to S810, the triangular polygon selected in step S801 is to be processed. Assume that the identification number of the triangular polygon selected in this step is i. A suffix "i" is an index associated with the triangular polygon selected in this step.

It is judged in step S802 whether or not an image of the primary reflection spot is observed by the image capturing unit of the distance measurement apparatus (first judgment). More specifically, if two lines that couple the barycenter of the triangular polygon selected in step S801, and the light source and image capturing unit do not intersect with a triangular polygon other than that selected in step S801, it is judged that the image is visible; if the lines intersect with another triangular polygon, it is judged that the image is invisible. The coordinates of the light source and image capturing unit when this judgment processing is executed use those which are converted onto the coordinate system of the target object based on the coarse position and orientation of the target object calculated in step S303 and the relative position and orientation of the light source with respect to the image capturing unit, which are loaded in step S301. If it is judged in this judgment processing that the image is visible (step S802; YES), the process advances to step S803. On the other hand, if it is judged that the image is invisible (step S802; NO), the process jumps to step S809.

In step S803, the coordinates of the primary reflection spot image are projected onto a captured image (first projection). More specifically, two-dimensional coordinates obtained when the barycentric position of the triangular patch selected in step S801 is projected onto the captured image based on the camera parameters loaded in step S301 and the coarse position and orientation of the target object calculated in step S303 are calculated.

In step S804, the coordinates of the secondary reflection spot image on the captured image are calculated. For this purpose, a direction that forms a bisector angle of a normal direction to the triangular polygon of the identification number i with respect to a line that couples the light source position and the barycenter of that polygon, that is, the reflection direction of the spot light is calculated. Then, an intersection between a line which has the primary reflection spot position as a start point and extends in the reflection direction, and the shape model is calculated. This intersection is the secondary reflection spot. It is judged whether or not this intersection exists (second judgment). If it is judged that the intersection exists, this secondary reflection spot is projected onto the captured image based on the camera parameters loaded in step S301 and the coarse position and orientation of the target object calculated in step S303 (second projection). The two-dimensional coordinates of this position are those to be calculated in step S804.

Subsequently, a possibility as to whether or not the secondary reflection spot image is found as a false spot image is evaluated based on the coordinates of the primary and secondary spot images calculated in steps S803 and S804 (steps S805 and S806).

More specifically, it is judged in step S805 whether or not a distance between the position of the secondary reflection spot image and an epipolar line on the captured image, which is determined based on a spot light irradiation direction from the light source, is less than a predetermined threshold (first discrimination). The threshold assumes a value which is determined based on a target range of spot search processing in the distance measurement apparatus. Then, it is evaluated whether or not a three-dimensional distance between the primary and secondary reflection spots is less than a predetermined threshold (second discrimination). This threshold assumes a value which depends on the reflectance of the target object surface, and is determined experimentally. It is judged in step S806 that a search error occurs when both these evaluation values are less than the thresholds (step S806; YES), and the process advances to step S807. On the other hand, if one of the evaluation values is equal to or larger than the threshold, it is judged that there is no possibility that the secondary reflection spot image is found as a false spot (step S806; NO), and the process advances to step S808.

In step S807, $s_i$ as an offset degree of the distance measurement result is calculated as an offset value based on:

$$s_i = \frac{\Delta Z}{Z} = \frac{g_i}{f \times L} \tag{11}$$

where $\Delta Z$ is the magnitude of an offset at a position of a distance Z. $g_i$ is a distance between the coordinates calculated in steps S803 and S804. f is a focal length of the image capturing unit in the distance measurement apparatus. L is a distance between a focal point of the image capturing unit and an optical axis of illumination, which is calculated from the relative position and orientation between the illumination unit and image capturing unit.

On the other hand, the offset degree $s_i$ of the distance measurement result is set to be zero in step S808. The offset degree=0 means that no systematic error of the distance value exists.

In step S809, the offset degree $s_i$ of the distance measurement result is set to be −1. The offset degree=−1 means a special value indicating that the triangular polygon is invisible.

Note that the offset degree $s_i$ set in step S807, S808, or S809 is stored in the memory 202 as a set with the identification number i of the polygon.

Finally, it is judged in step S810 whether or not the offset degrees of distance measurement have been set for all the triangular polygons included in the shape model. If all the polygons have been processed, the distance measurement error estimation processing ends. On the other hand, if polygons to be processed still remain, the process returns to step S801.

The sequence of the distance measurement error estimation processing (step S304) according to this embodiment has been described.

Finally, the local region selection processing, that is, the sample point determination processing (step S305) according to this embodiment will be described. In step S305, in association with each triangular polygon included in the shape model, the number $N_i$ of sample points is calculated based on:

$$N_i = 0, \text{ if } s_i \leq 0 \qquad (2)$$
$$= S \times (d_i/D)^2 \times A_i \times |\cos\beta_i| \times C_s \times (1 - s_i), \text{ otherwise}$$

Meanings of symbols S, D, $d_i$, $A_i$, and $\beta_i$ in equation (12) are the same as those in equation (2) described in the first embodiment. $s_i$ is the offset degree of the distance measurement value calculated in step S304. $C_s$ is a coefficient (constant) required to adjust the degree of contribution of the offset degree with respect to the number of sample points.

Since the method of determining sample point positions on the triangular polygon to be processed based on the number $N_i$ of sample points calculated in this process is the same as that described in the first embodiment, a description thereof will not be repeated.

As described above, using the method of this embodiment, sample points on the model plane, which are to be associated with the range image, can be adaptively selected according to the offset degrees of the range image measurement values. Hence, the estimation precision of the position and orientation can be maintained while speeding up the processing by reducing the number of corresponding points.

Note that the embodiments of the present invention are not limited to those described above, and various modifications can be made. The 10th to 13th embodiments to be described hereinafter are modifications of the second embodiment.

10th Embodiment

The contents described in the second to eighth embodiments as the modifications of the first embodiment are also applicable to this embodiment.

11th Embodiment

In the above description, the distance measurement offset degree associated with each triangular polygon is evaluated based on the barycentric position of that triangular polygon. However, the position of a point used in error evaluation is not limited to this. The number of points used in evaluation is not limited to one, but a plurality of points may be used. At this time, offset degrees calculated at the plurality of points may be averaged to calculate one offset degree per triangular polygon. Alternatively, one triangular polygon may be divided into a plurality of small regions, and offset degrees may be calculated for respective small regions to determine the number of samples for each small region.

12th Embodiment

In the above description, the magnitude of an error by the secondary reflection spot light is estimated. However, an error caused by another factor may be evaluated.

For example, when a light source (for example, an illumination device) other than that of the distance measurement apparatus exists, if the position and irradiation direction of that light source, and the specular reflection characteristics of the measurement target object are known, the position of a specular reflection image generated on the object surface by light of that light source can be estimated. Then, an offset degree of the distance measurement value can be calculated based on the positional relationship between the specular reflection image and the primary reflection spot image on the image.

Figure 9:
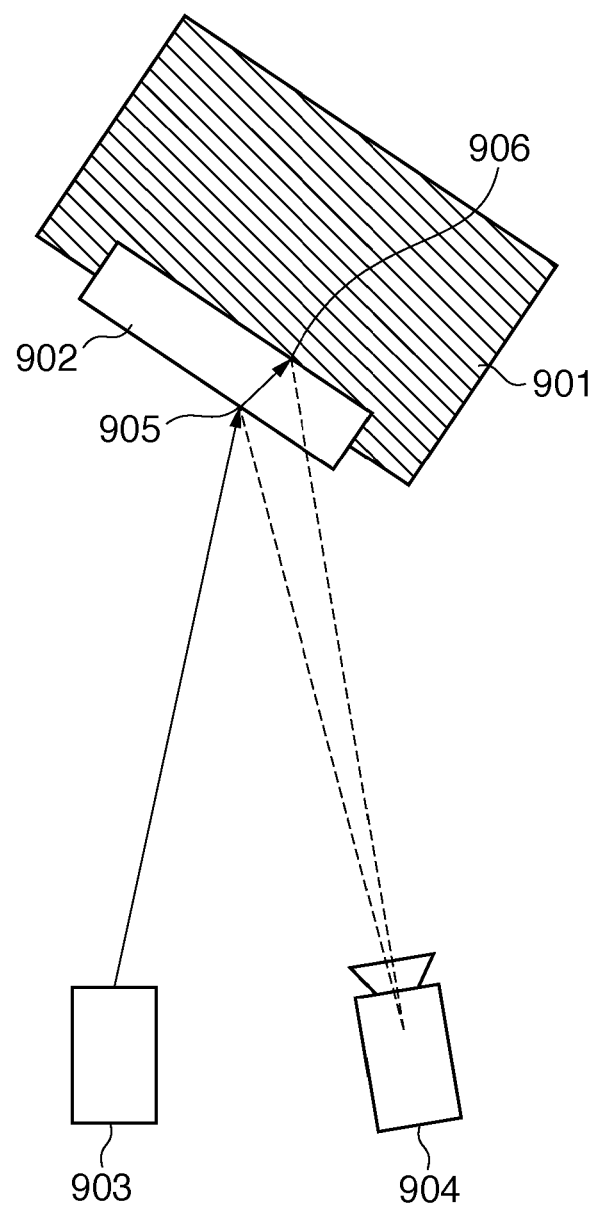
FIG. 9 is a view for explaining the second principle of generation of systematic errors upon measurement of a range image.

Also, as shown in FIG. 9, assume that there is a measurement target object configured by a portion 901 of an opaque material and a portion 902 of a transparent material. At this time, spot light emitted from a light source 903 included in the distance measurement apparatus generates a spot at a point 905 on the surface of the transparent portion 902. Also, the spot light is transmitted through the transparent portion 902, and generates a spot at a point 906 on the boundary between the opaque portion 901 and transparent portion 902. In such case as well, an optical path of the spot light is simulated to calculate a distance between the spots on the image, thus allowing to calculate an offset degree according to that distance.

Figure 10A:
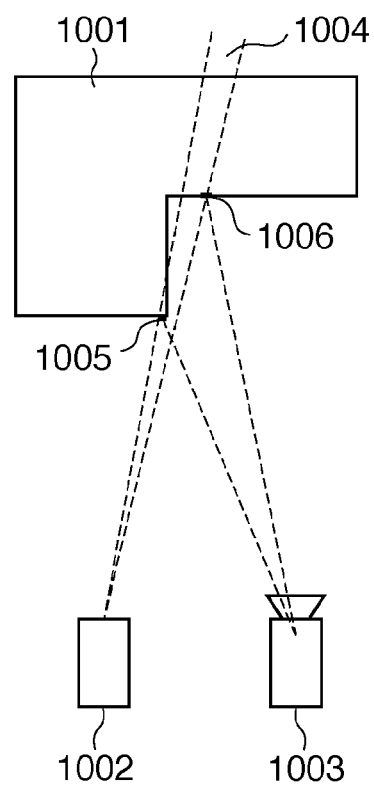
FIGS. 10A and 10B are views for explaining the third principle of generation of systematic errors upon measurement of a range image.
Figure 10B:
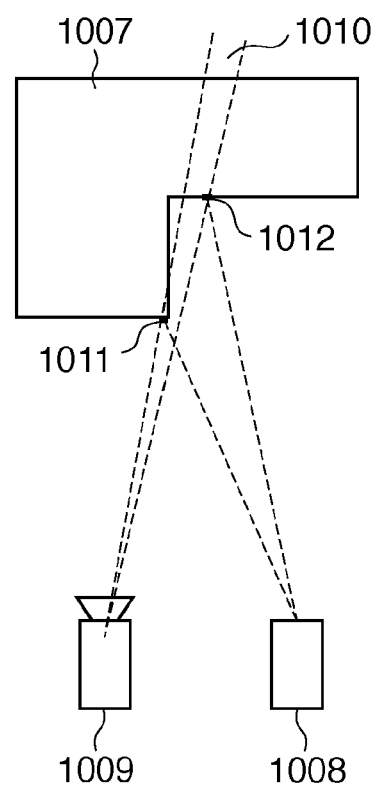

In addition, as shown in FIGS. 10A and 10B, a plurality of points having different distances are observed, and an offset error is generated in a distance measurement value in some cases. In FIGS. 10A and 10B, each of measurement target objects 1001 and 1007 is an object to be measured. Each of light sources 1002 and 1008 is that which configures a distance measurement apparatus. Each of image capturing units 1003 and 1009 is that which configures the distance measurement apparatus. FIG. 10A shows a case in which a plurality of spots 1005 and 1006 are generated at a plurality of positions included in a region 1004 irradiated with a ray of spot light, and cause an offset error of a distance value. FIG. 10B shows a case in which spots 1011 and 1012 due to spot light in two different directions are observed on one pixel, and cause an offset error of a distance value. In case of FIG. 10A, an offset degree of the distance value is calculated by, for example, the following method. That is, two lines which form a minimal angle in the scan direction of the spot light are extended from the light source 1002 in the barycentric direction of a small region of the model, and a difference between distances between the two points that intersect with the model of the target object can be calculated as an offset degree. In case of FIG. 10B, line segments can be similarly extended from the image capturing unit 1009.

13th Embodiment

In the above description, a range image is measured based on the spot light method. However, the distance measurement method is not limited to this. Another active method such as a light-section method may be used. The present invention is not limited to the active method, and a passive method such as a stereo method may be used. In case of the passive method, for example, under the assumption that a corresponding point search between two images causes an error due to a repetitive pattern formed on the measurement target object, an offset degree of a distance measurement value can be evaluated based on a repetition interval of the pattern.

14th Embodiment

In the first and ninth embodiments, errors (variations and offsets) upon distance measurement are calculated by simulation. However, the error estimation method is not limited to this. For example, errors can be determined based on distance data obtained by actually measuring a target object.

Processing based on the method of this embodiment is classified into offline processing for preparing for offset error data required to determine sample points on a model, and online processing for calculating the position and orientation of the target object by determining sample points based on the error data. Note that a model assumed in this embodiment is a patch model configured by triangular patches. An arbitrary distance measurement method can be used. For example, a light-section method is used.

In the offline processing, a virtual Geodesic sphere in which the target object is arranged at the central position is assumed, and distance measurement apparatuses arranged at positions corresponding to vertices of that sphere capture range images of the target object. The following processes (1) to (5) are applied to each of the captured range images.

(1) A coarse position and orientation of the target object are estimated. The estimation method is the same as that in the first or ninth embodiment.

(2) Points on the model corresponding to respective pixels of the range image are searched for, and three-dimensional points corresponding to the pixels of the range image and corresponding points on the model are stored as corresponding point pairs.

(3) The position and orientation of the target object are estimated by optimizing the position and orientation of the model so as to minimize a sum total of the distances between the corresponding point pairs. The values calculated in this step are set as true values of the position and orientation of the target object.

(4) In a state in which the model is arranged at the position and orientation of the true values, differences between distance values calculated from the positions of the points on the model, which correspond to the pixels of the range image, and those of the pixels on the range image are calculated, and an average value of the differences of the distance values is calculated for each polygon patch.

(5) The average value calculated in the process (4) is registered as a range image measurement offset error for each polygon patch of model data prepared for each vertex (each range image) of the Geodesic sphere.

On the other hand, in the online processing, the following processes (6) to (11) are executed.

(6) A coarse position and orientation of the target object are estimated by measuring the range image of the target object.

(7) A vertex closest to a viewpoint at the time of capturing the range image of the process (6) is selected from those on the Geodesic sphere based on the coarse position and orientation calculated in the process (6).

(8) An offset error of each polygon is read out from model data registered in association with the vertex selected in the process (7), and the number of sample points is calculated based on the error value (details of the determination method of the number of sample points are the same as those in the ninth embodiment).

(9) Sample point positions of each polygon are determined based on the number of sample points calculated in the process (8) (details of the sample point position determination method are the same as those in the first and ninth embodiments).

(10) The sample points, the positions of which are determined in the process (9), are associated with the range image to calculate corresponding point pairs (details of the method of associating the sample points with the range image are the same as those in the first and ninth embodiments).

(11) Optimization calculations are made to minimize a sum total of distances between the corresponding point pairs calculated in the process (10) to calculate the position and orientation of the target object (details of the position/orientation calculation method are the same as those in the first and ninth embodiments).

According to the method described in this embodiment, sample points can be determined based on actual distance measurement data of the target object. As a result, compared to the method of estimating distance measurement errors by simulation, the estimation precision of errors can be improved, and an effect of increasing the processing speed while maintaining the position/orientation estimation precision can be enhanced.

Note that the embodiments of the present invention are not limited to those described above, and various modifications can be made. The 15th or 16th embodiment to be described below is a modification of the 14th embodiment.

15th Embodiment

The second to eighth embodiments as the modifications of the first embodiment are applicable to this embodiment.

16th Embodiment

The method of estimating offset errors upon distance measurement from an actually measured range image has been described. Also, variation errors can also be estimated. More specifically, a sample variance calculated for each polygon patch in association with a difference between actually measured and true distance values can be used as a variation error of that polygon.

According to the present invention, the density of corresponding points used to measure the position and orientation is controlled according to errors upon distance measurement, thereby increasing the processing speed while suppressing the position/orientation measurement precision from lowering.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable storage medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-043064 filed on Feb. 26, 2010, which is hereby incorporated by reference herein in its entirety.

What is claimed is:
1. An apparatus comprising:
an obtaining unit configured to obtain a range image which indicates distance information to a target object, which is captured by an image capturing unit;
a coarse position/orientation obtaining unit configured to obtain a coarse position and orientation of the target object;
an estimation unit configured to estimate a variation degree of distance information on a region of the range image, wherein the region corresponds to a predetermined region on a shape model of the target object;

a selection unit configured to select, for each predetermined region on the shape model, sample points from the predetermined region in accordance with the estimated variation degree, so as to reduce the number of sample points as the variation degree is smaller;

an association unit configured to associate the selected sample points and three-dimensional measurement points obtained based on the coarse position and orientation; and a position/orientation determination unit configured to determine the position and orientation of the target object based on a result of the association unit.

2. The apparatus according to claim 1, wherein said association unit converts three-dimensional coordinates of the sample points on a three-dimensional coordinate system with reference to the target object into three-dimensional coordinates on a three-dimensional coordinate system with reference to the image capturing unit based on the coarse position and orientation, said association unit projects three-dimensional coordinates of the converted sample points onto the range image, said association unit searches a pixel on the range image, which is adjacent to a projected point on a two-dimensional coordinate system on the projected range image, said association unit calculates, based on a two-dimensional measurement point of a pixel obtained by the search result, and distance information for that pixel, a three-dimensional measurement point of that pixel with reference to the image capturing unit, said association unit converts three-dimensional measurement points with reference to the image capturing unit into three-dimensional measurement points on the three-dimensional coordinate system with reference to the target object based on the coarse position and orientation, and said association unit associates, on the three-dimensional coordinate system with reference to the target object, the sample points with the three-dimensional measurement points on the three-dimensional coordinate system of the target object.

3. The apparatus according to claim 1, wherein the estimation unit estimates the variation degree based on at least one of relative position of the image capturing unit with respect to the target object, a shape of the target object, and optical characteristics.

4. The apparatus according to claim 1, wherein the estimation unit estimates the variation degree based on the slope of the surface of the target object relative to a capturing direction of the image capturing unit.

5. The apparatus according to claim 1, wherein the estimation unit estimates the variation degree based on an internal scattering rate of the target object.

6. The apparatus according to claim 1, wherein the estimation unit estimates the variation degree, based on a reflectance in a surface of the target object.

7. A position and orientation measurement apparatus comprising:

an obtaining unit configured to obtain a range image which indicates distance information to a target object, which is captured by an image capturing unit;

a coarse position/orientation obtaining unit configured to obtain a coarse position and orientation of the target object;

an error estimation unit configured to estimate a systematic error included in distance information on a region of the range image, where the region corresponds to a predetermined region on the shape model;

a selection unit configured to select, for each predetermined region on the shape model, sample points from the predetermined region in accordance with the estimated systemic error, so as to reduce the number of sample points as the systematic error is larger;

an association unit configured to associate the selected sample points and three-dimensional measurement points based on the coarse position and orientation; and a position/orientation determination unit configured to determine the position and orientation of the target object based on a result of the association unit.

8. The apparatus according to claim 7, wherein said association unit converts three-dimensional coordinates of the sample points on a three-dimensional coordinate system with reference to the target object into three-dimensional coordinates on a three-dimensional coordinate system with reference to the image capturing unit based on the coarse position and orientation, said association unit projects the three-dimensional coordinates of the converted sample points onto the range image, said association unit searches a pixel on the range image, which is adjacent to a projected point on a two-dimensional coordinate system on the projected range image, said association unit calculates, based on a two-dimensional measurement point of a pixel obtained by the search result, and distance information for that pixel, a three-dimensional measurement point of that pixel with reference to the image capturing unit, said association unit converts three-dimensional measurement points with reference to the image capturing unit into three-dimensional measurement points on the three-dimensional coordinate system with reference to the target object based on the coarse position and orientation, and said association unit associates, on the three-dimensional coordinate system with reference to the target object, the sample points with the three-dimensional measurement points on the three-dimensional coordinate system of the target object.

9. The apparatus according to claim 7, further comprising:

a region selection unit adapted to select a unit region which configures a surface of the shape model;

a first judgment unit adapted to judge whether or not an image of a primary reflection point irradiated with light coming from a light source on the shape model is observed by the image capturing unit;

a first projection unit adapted to project, as two-dimensional coordinates, when said first judgment unit judges that the image of the primary reflection point is observed by the image capturing unit, the image of the primary reflection point onto a captured image captured by the image capturing unit;

a second judgment unit adapted to judge whether or not an image of a secondary reflection point on another surface of the shape mode, which point is irradiated with light reflected by the primary reflection point, is observed by the image capturing unit;

a second projection unit adapted to project, as two-dimensional coordinates, when said second judgment unit judges that the image of the secondary reflection point is observed by the image capturing unit, the image of the secondary reflection point onto the captured image;

a first discrimination unit adapted to discriminate whether or not a distance between the two-dimensional coordinates of the secondary reflection point on the captured image and a projected line obtained by projecting a line along an irradiation direction of the light coming from the light source onto the captured image is less than a threshold; and a second discrimination unit adapted to discriminate whether or not a three-dimensional distance between the primary reflection point and the secondary reflection point is less than a threshold, wherein when said first discrimination unit and said second discrimination unit discriminate that both the distances are less than the thresholds, said error estimation unit estimates the systematic error as a value obtained by dividing a distance between two-dimensional coordinates of the primary reflection point and two-dimensional coordinates of the secondary reflection point by a product of a focal length of the image capturing unit and a distance between an optical axis of the light source and a focal point of the image capturing unit.

10. A method comprising the steps of:

obtaining a range image which indicates distance information to a target object, which is captured in an image capturing process;

obtaining a coarse position and orientation of the target object;

estimating a variation degree of distance information on a region of the range image, wherein the region corresponds to a predetermined region on a shape model;

selecting, for each predetermined region on the shape model, sample points from the predetermined region in accordance with the estimated variation degree, so as to reduce the number of sample points as the variation degree is smaller;

associating the selected sample points and three-dimensional measurement points based on the coarse position and orientation; and determining, using a processor, the position and orientation of the target object based on an associated result.

11. A position and orientation measurement method comprising:

obtaining a range image which indicates distance information to a target object, which is captured in an image capturing process;

obtaining a coarse position and orientation of the target object;

estimating a systematic error included in distance information on a region of the range image, wherein the region corresponds to a predetermined region on the shape model;

selecting, for each predetermined region on the shape model, sample points from the predetermined region in accordance with the estimated systematic error, so as to reduce the number of sample points as the systematic error is larger;

associating the selected sample points and three-dimensional measurement points based on the coarse position and orientation; and determining, using a processor, the position and orientation of the target object based on an associated result.

12. A non-transitory computer-readable storage medium storing a computer program for controlling a computer to execute a position and orientation measurement method according to claim 10.

13. A non-transitory computer-readable storage medium storing a computer program for controlling a computer to execute a position and orientation measurement method according to claim 11.

* * * * *